US010066149B2

(12) United States Patent
Li et al.

(10) Patent No.: US 10,066,149 B2
(45) Date of Patent: Sep. 4, 2018

(54) DELAYED BREAKER FOR VISCOELASTIC SURFACTANT-BASED FLUIDS

(71) Applicant: Akzo Nobel Chemicals International B.V., Arnhem (NL)

(72) Inventors: Lingling Li, Ridgefield, CT (US); James Frederic Gadberry, Danbury, CT (US); Nick Henry Wolf, Danbury, CT (US); Jian Zhou, Langhorne, PA (US)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/526,806

(22) PCT Filed: Nov. 23, 2015

(86) PCT No.: PCT/EP2015/077391
§ 371 (c)(1),
(2) Date: May 15, 2017

(87) PCT Pub. No.: WO2016/083322
PCT Pub. Date: Jun. 2, 2016

(65) Prior Publication Data
US 2018/0215992 A1 Aug. 2, 2018

Related U.S. Application Data (60) Provisional application No. 62/083,605, filed on Nov. 24, 2014.

(30) Foreign Application Priority Data

Feb. 2, 2015 (EP) .................................... 15153399

(51) Int. Cl.
| E21B 43/22 | (2006.01) |
| C09K 8/62 | (2006.01) |
| C09K 8/60 | (2006.01) |
| C09K 8/74 | (2006.01) |
| C09K 8/68 | (2006.01) |
| C09K 8/42 | (2006.01) |
| E21B 43/04 | (2006.01) |
| E21B 43/26 | (2006.01) |

(52) U.S. Cl.
CPC ................ *C09K 8/602* (2013.01); *C09K 8/42* (2013.01); *C09K 8/68* (2013.01); *C09K 8/74* (2013.01); *C09K 2208/26* (2013.01); *C09K 2208/30* (2013.01); *E21B 43/04* (2013.01); *E21B 43/26* (2013.01)

(58) Field of Classification Search
CPC ...... C09K 2208/26; C09K 8/602; E21B 43/16
See application file for complete search history.

(56) References Cited

U.S. PATENT DOCUMENTS

| 2,943,061 | A | 6/1960 | Kirkpatrick et al. |
| 3,042,625 | A | 7/1962 | Kirkpatrick et al. |
| 3,435,898 | A | 4/1969 | Thompson et al. |
| 3,480,083 | A | 11/1969 | Oleen et al. |
| 3,647,688 | A | 3/1972 | Morrison et al. |
| 4,007,792 | A | 2/1977 | Meister |
| 4,278,129 | A | 7/1981 | Walton |
| 4,393,935 | A | 7/1983 | Walton |
| 5,591,700 | A | 1/1997 | Harris et al. |
| 6,881,709 | B2 | 4/2005 | Nelson et al. |
| 7,084,095 | B2 | 8/2006 | Lee et al. |
| 7,410,934 | B2 | 8/2008 | Hughes et al. |
| 7,635,028 | B2 | 12/2009 | Li et al. |
| 7,655,603 | B2 | 2/2010 | Crews |
| 7,696,134 | B2 | 4/2010 | Crews et al. |
| 7,857,051 | B2 | 12/2010 | Abad et al. |
| 7,879,770 | B2 | 2/2011 | Lin et al. |
| 7,992,640 | B2 | 8/2011 | Huang et al. |
| 8,012,914 | B2 | 9/2011 | Welton |
| 8,067,342 | B2 | 11/2011 | Lin et al. |
| 2002/0004464 | A1* | 1/2002 | Nelson ................... C09K 8/536 507/200 |

(Continued)

FOREIGN PATENT DOCUMENTS

| CN | 101921583 A | 12/2010 |
| SU | 261619 | 1/1970 |
| WO | 99/61747 A1 | 2/1999 |
| WO | 01/77487 A2 | 10/2001 |
| WO | 2008/035254 A2 | 3/2008 |
| WO | 2009/032524 A2 | 3/2009 |

OTHER PUBLICATIONS

European Search Report issued in counterpart EP Application No. 1515399.9 dated Jul. 16, 2015.

(Continued)

*Primary Examiner* — Zakiya W Bates
(74) *Attorney, Agent, or Firm* — Matthew J. DeRuyter (57) ABSTRACT

Compositions and methods are provided for delayed breaking of viscoelastic surfactant gels inside subterranean formations. Breaking is accomplished without mechanical intervention or use of a second fluid. The delayed breaking agent is selected from alkyl ether phosphates and salts thereof, alkylaryl ether phosphates and salts thereof, alkyl sulfates and salts thereof, alkylaryl sulfates and salts thereof, alkyl ether sulfates and salts thereof, alkylaryl ether sulfates and salts thereof, and mixtures of any of the foregoing. The viscoelastic surfactant can be a zwitterionic surfactant, and can be selected from the group consisting of sultaines, betaines, and amidoamine oxides.

13 Claims, 8 Drawing Sheets

(56) References Cited

U.S. PATENT DOCUMENTS

| | | |
|---|---|---|
| 2004/0180969 A1 | 9/2004 | Lang |
| 2007/0299142 A1 | 12/2007 | Crews et al. |
| 2009/0192053 A1 | 7/2009 | Crews et al. |
| 2010/0163228 A1 | 7/2010 | Abad et al. |
| 2011/0111991 A1 | 5/2011 | Samuel et al. |
| 2013/0190215 A1 | 7/2013 | Huang |
| 2015/0057377 A1* | 2/2015 | Jones .................. B01D 17/047 516/135 |

OTHER PUBLICATIONS

International Search Report and Written Opinion for PCT/EP2015/077391 dated Feb. 1, 2016.
International Preliminary Report on Patentability for PCT/EP2015/077391 dated May 30, 2017.
Shandong Huagong (2004), Abstract, 33(4), 1-2,7.

* cited by examiner

DELAYED BREAKER FOR VISCOELASTIC SURFACTANT-BASED FLUIDS

This application is a national stage filing under 35 U.S.C. § 371 of PCT/EP2015/077391, filed Nov. 23, 2015, which claims priority to U.S. Provisional Patent Application No. 62/083,605, filed Nov. 24, 2014 and European Patent Application No. 15153399.9, filed Feb. 2, 2015, the contents of each of which are each incorporated herein by reference in their entirety.

FIELD OF THE INVENTION

This invention relates to compositions and methods for facilitating the delayed breaking of viscoelastic surfactant-based fluids, used in the treatment of subterranean formations and in oil and gas wells.

BACKGROUND OF THE INVENTION

High viscosity fluids are useful in many functions conducted in subterranean formations, particularly subterranean formations that are potential sources of oil and natural gas. Such functions can include, for example, hydraulic fracturing, gravel packing, matrix acidizing, and fracture acidizing.

Viscoelastic surfactants (VES) are a class of gelling agents that have been used to provide high viscosity fluids for many such functions in subterranean formations, particularly in the recovery of oil and gas. These high viscosity fluids, known as gels, can perform functions such as acidizing, fracturing, and completion. After the desired function has been performed, there is oftentimes a need to break the gel to reduce the viscosity of the fluid to allow its removal from one or more sites in the subterranean formation.

One option to break the gel is dilution with fluids naturally present in the formation, such as crude oil hydrocarbon, condensate and formation water. In many instances, however, VES fluids in the formation are not completely broken which can make their removal difficult and impede recovery of the desired subterranean oil or gas. One method to improve the clean-up of VES fluids is to use pre-flush or post-flush fluids which may contain aromatic hydrocarbons, alcohols, mutual solvents and/or other breaking additives. One problem with the use of pre-flush or post-flush fluids is their limited interaction with the gel due to small fluid-fluid interfaces. Usually only some sections of the formation achieve the fluid-fluid interface required to break the gel and allow its removal, while in the remaining sections of the formation the gel remains unbroken. Therefore, contacting and breaking the gel with pre-flush or post-flush treatment is not always effective. Additionally, the volumes of the flushes can be high.

To efficiently break a viscosified fluid and to have a better control of breaking, it is desirable to have a delayed internal breaker which breaker can be activated by subterranean conditions to provide a controlled rate of gel viscosity reduction.

Various types of delayed internal breakers are known to reduce the viscosity of VES gels, such as acids, oxides, enzymes, and transition metals. Proper placement is a key factor for any breaker. It must have a sufficient interface with the fluid that is to be broken. Most conventional breakers cannot clean up the VES gel once the high viscosity fluid enters the formation fissures or pores, because the required interface cannot be achieved. Therefore, there exists a need for compositions and methods for breaking VES fluids under different subterranean conditions and at predetermined times.

U.S. Pat. No. 6,881,709 B2 discloses a precursor of a breaking system which reduces the viscosity of the fluid by melting, slow dissolution, and de-adsorption of a breaking agent absorbed into solid particles. In one disclosed embodiment the breaker comprises salts provided in an encapsulated form. It is possible that such a solid breaker formulation may settle out of the gel and cause an inefficient or premature break of the VES gel. Moreover, if a solid encapsulated breaker formulation is used in hydraulic fracturing, the breaker mechanism may rely on the fracture closure to crush the capsules and release the breaking salt. In that case, any high viscosity fluid that is forced out of the fracture during the closure would not be broken. U.S. Pat. No. 7,084,095 discloses a method of treating a subterranean formation comprising the steps of injecting down a well an aqueous fluid comprising a thickening amount of a viscoelastic surfactant and providing an encapsulated polymer additive that causes a change in rheology of the fluid under downhole conditions. The patent also discloses a polymer additive for treatment of a subterranean formation wherein the polymer additive is selected from sulfonated polynaphthalenes, sulfonated polystyrenes, and sulfonated styrene/maleic anhydride polymers.

U.S. Pat. No. 7,635,028 discloses an acidic internal breaker, which can be an inorganic or organic acid. However, this approach may not be optimum in applications that are conducted at low pH. The reference additionally discloses that a corrosion inhibitor can be used with the acidic internal breaker to protect any well tubing that may be present.

U.S. Pat. No. 7,655,603 discloses a method for treating a subterranean reservoir comprising the use of an aqueous fluid gelled with a viscoelastic surfactant and a micro-emulsion, wherein the micro-emulsion comprises at least one viscosity reducing agent comprising at least one unsaturated fatty acid, at least one solubilizing agent, at least one desorption agent, and at least one water wetting agent.

U.S. Pat. No. 7,879,770 discloses an oxidative internal breaking agent and a free radical propagating agent selected from metabisulfites, reducing sugars and reducing di-, tri-, oligo- and poly-saccharides. The oxidative breaking agent can be triggered by chemical or physical conditions, such as temperature or pH. The breaking rate can be optionally accelerated or delayed. It is possible, however, that oxidizers may not always work efficiently as delayed breakers. Furthermore, it is possible that phase separation and/or precipitation may occur if a higher dosage is used.

Thus there is a need for a delayed internal breaking agent that can be mixed with a viscoelastic surfactant, yet does not reduce the viscosity and elasticity of the VES fluid for at least several hours so that the VES fluid can perform its function. Ideally the internal breaking agent should be compatible with the VES, should move throughout the formation along with the VES, and should reduce both the viscosity and elasticity of the VES fluid at the appropriate time.

SUMMARY OF THE INVENTION

This invention relates to compositions and methods for facilitating the delayed breaking of viscoelastic surfactant-based fluids, particularly in the treatment of subterranean formations such as oil and gas wells. More specifically, this invention relates to compositions and methods for facilitating the delayed breaking of viscoelastic surfactant-based fluids, for acidizing, fracturing, and gravel packing applications.

In one aspect of the invention, a composition for facilitating the delayed breaking of a viscoelastic surfactant-based fluid comprises an aqueous fluid, a viscoelastic surfactant, and one or more breaking agents, the breaking agents being selected from the group consisting of alkyl ether phosphates and salts thereof, alkylaryl ether phosphates and salts thereof, alkyl sulfonic acids and salts thereof, alkylaryl sulfonic acids and salts thereof, alkyl sulfates and salts thereof, alkylaryl sulfates and salts thereof, alkyl ether sulfates and salts thereof, alkylaryl ether sulfates and salts thereof, and mixtures of any two or more of the foregoing.

In one aspect of the invention, a method for treating a subterranean formation comprises introducing to the formation a fluid comprising an aqueous fluid, a viscoelastic surfactant, and a breaking agent, the breaking agent being selected from the group consisting of alkyl ether phosphates and salts thereof, alkylaryl ether phosphates and salts thereof, alkyl sulfonic acids and salts thereof, alkylaryl sulfonic acids and salts thereof, alkyl sulfates and salts thereof, alkylaryl sulfates and salts thereof, alkyl ether sulfates and salts thereof, alkylaryl ether sulfates and salts thereof, and mixtures of any two or more of the foregoing, such that the fluid is in the form of a gel in the subterranean formation, and then allowing the breaking agent to act upon the gel to reduce the viscosity thereof.

In one embodiment of the invention the viscoelastic surfactant is selected from sultaines, betaines, and amidoamine oxides.

In one embodiment of the invention the breaker is selected from alkyl ether phosphates and salts thereof, and alkylaryl ether phosphates and salts thereof.

In one embodiment of the invention the breaker is selected from alkyl ether phosphates and salts thereof.

In one embodiment of the invention the aqueous fluid comprises one or more salts. In one embodiment the aqueous fluid is a brine, being a saturated solution (at 20° C.). In one embodiment the salt is alkali metal salt. In one embodiment the salt is an alkaline earth metal salt. In one embodiment the alkali metal salt is NaCl, KCl, and/or their bromide or formate equivalents. In one embodiment the alkaline earth metal salt is $CaCl_2$ and/or its bromide or formate equivalent. In one embodiment the aqueous fluid includes a mixture of salts.

DETAILED DESCRIPTION OF THE INVENTION

In one aspect of the invention, an oilfield treatment composition comprises an aqueous fluid, a viscoelastic surfactant and a delayed breaker. The viscoelastic surfactant will act on the treatment composition to form a VES-based gel. The breaker should stay with the VES-based gel to enable an efficient and complete break. One advantage of the present invention is that delayed breaking of the VES-based gel can be achieved without sacrificing the initial fluid viscosity, for example, as required for gravel pack and hydraulic fracturing. In addition, the breaking rate can be controlled in a desired period. The breaking will not efficiently start until the desired function of the VES-based gel is accomplished.

The composition and method of the present invention find utility in hydraulic fracturing, gravel packing, matrix acidizing and fracture acidizing, although it is to be understood that the invention may be used in many other applications.

In hydraulic fracturing, the viscoelastic surfactant-based fluids create channels or fractures in oil producing reservoir zones in order to improve oil production by providing a high permeability pathway from the reservoir rock to the well bore. Typically, fracturing fluids are pumped at pressures exceeding the overburden weight of the rock formation thereby causing splits and fractures in the formation rock. Conventional proppants can be added to the fluid to prevent the induced fractures from closing after the pumping phase is over by propping open the induced splits and fractures. Gelling agents can be added to the fluid to transport the proppants and to reduce fluid leakoff.

The invention is especially useful in gravel packing, where high density viscous fluids are used to place prepared gravel of a specific size in a surrounding annulus to minimize sand production. Gravel packing involves the use of heavy brine which can comprise monovalent salts, divalent salts, and mixtures thereof. Usually, bromide or formate salts are used to make high density brine for deep well applications.

There are two types of acid treatment: fracture acidizing, in which acid is injected at pressures above fracture pressure to etch the faces of the resultant fractures, and matrix acidizing in which acid is injected at pressures below the fracture pressure to dissolve flow channels in the rock or to remove scale or damage caused by drilling. Acids suitable for use in these treatment techniques include, but are not limited to, hydrochloric, hydrofluoric, fluoroboric, acetic and formic acids and mixtures thereof, and those acids in the form of acid-oil emulsions. The acids can contain some additives, such as corrosion inhibitors, and iron control agents. Self-diverting and delayed acids can be gelled with suitable viscoelastic surfactants.

In one embodiment of the invention a fluid composition comprises an aqueous fluid, a viscoelastic surfactant, and a delayed breaker selected from alkyl ether phosphates and salts thereof, alkylaryl ether phosphates and salts thereof, alkyl sulfonic acids and salts thereof, alkylaryl sulfonic acids and salts thereof, alkyl sulfates and salts thereof, alkylaryl sulfates and salts thereof, alkyl ether sulfates and salts thereof, alkylaryl ether sulfates and salts thereof, and mixtures of any two or more of the foregoing.

By "alkyl ether phosphates" and "alkylaryl ether phosphates" is meant compounds of the formula (I)

(I)

where R is alkyl or alkylaryl, respectively.

By "alkyl sulfates" and "alkylaryl sulfates" is meant compounds of the formula (II)

(II)

where R is alkyl or alkylaryl, respectively.

By alkyl ether sulfates and alkylaryl ether sulfates is meant compounds of the formula (III)

(III)

where R is alkyl or alkylaryl, respectively.

By "alkyl sulfonates" and "alkylaryl sulfonates" is meant compounds of the formula (IV)

(IV)

where R is alkyl or alkylaryl, respectively.

In each of the foregoing formulas (I)-(IV) the alkyl portion of R is a saturated or unsaturated linear or branched hydrocarbon group of from about 6 carbon atoms, in an embodiment from about 8 carbon atoms, in an embodiment from about 10 carbon atoms up to about 30 carbon atoms, in an embodiment up to 20 carbon atoms, in an embodiment up to 16 carbon atoms, in an embodiment up to 14 carbon atoms. In any quantity of the breaker R can be restricted to a single chain length or may be of mixed chain length. In one embodiment the breaker is of formula I where R is saturated $C_{10}$-$C_{14}$alkyl of single or mixed chain length and m is 3.

Where R is an alkylaryl then the aryl group is a substituted or unsubstituted aromatic hydrocarbon group containing 1-3 five-or-six membered rings, preferably 1 or 2 five-or-six membered rings, and most preferably the aryl group is phenyl.

In formulas (I) and (III) the ethoxylate group or groups can be a single length of m or a mixture of lengths over the range of m, where m is an integer from 2-20, in another embodiment 2-12, in still another embodiment 2-6, and in yet another embodiment 2-4.

In formulas (I) and (III) n is an integer selected from 1 and 2.

Also encompassed by the invention are breakers that are salts of the compounds of formulas (I)-(IV), in which one or more of the (—OH) groups instead will be an (—OM⁺) group where M⁺ is the cation of the salt. Suitable cations include alkali metal cations and ammonium ions.

In one embodiment the aqueous fluid can be a brine composition that comprises one or more salts. In one embodiment the brine is a saturated solution (at 20° C.). The brine can be either a light brine or a heavy brine depending on the function to be performed by the fluid, as is known in the art. In an embodiment the salt is alkali metal salt. In an embodiment the salt is an alkaline earth metal salt. In an embodiment the alkali metal salt is NaCl, KCl, and/or their bromide or formate equivalents. In an embodiment the alkaline earth metal salt is $CaCl_2$. and/or its bromide or formate equivalent. In an embodiment the brine contains one or more monovalent and/or divalent cations, such as $Na^+$, $K^+$, $Ca^{2+}$, $Mg^{2+}$ or $Zn^{2+}$. Suitable salts for use in the brines used in this invention include without limitation, NaCl, NaBr, $CaCl_2$, and KCl.

Viscoelastic Surfactants (VES)

The viscoelastic surfactants included in the present invention may comprise any suitable surfactant that is able to impart viscoelastic properties to an aqueous fluid. The surfactants may be zwitterionic, cationic, anionic, or amphoteric in nature. The delayed breakers of this invention have been found to be particularly useful when used with several types of zwitterionic surfactants, including but not limited to betaines, sultaines, and amidoamine oxides.

Sultaines have the general formula:

(V)

wherein $R^1$ can be either a saturated or unsaturated hydrocarbon group of from about 12 to about 30 carbon atoms, or $R^1$ can be in the form of $RCONH(CH_2)_k$ wherein R is a saturated or unsaturated, hydrocarbon group of at least about 17 carbon atoms, in one embodiment at least about 18, in one embodiment up to about 29 carbon atoms, in one embodiment up to about 21 carbon atoms, in one embodiment a fatty aliphatic derived from natural fats or oils, and k is an integer of at least 2, in one embodiment up to 20, in one embodiment up to 12, in one embodiment up to 6, and in one embodiment up to 4; $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms; $R^4$ is selected from H, hydroxyl, alkyl or hydroxyalkyl groups of from 1 to about 4 carbon atoms, in one embodiment $R^4$ is selected from ethyl, hydroxyethyl, —OH or methyl; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1.

In one embodiment, the viscoelastic surfactant is a sultaine having a formula (Va):

(Va)

wherein R is a saturated or unsaturated, hydrocarbon group of from about 17 to about 29 carbon atoms, in one embodiment from about 18 to about 21 carbon atoms. In one embodiment, R is a fatty aliphatic derived from natural fats or oils having an iodine value of from about 1 to about 140, in one embodiment from about 30 to about 90, and in one embodiment from 40 to about 70. R may be restricted to a single chain length or may be of mixed chain length such as those groups derived from natural fats and oils or petroleum stocks. Tallow alkyl, hardened tallow alkyl, rapeseed alkyl, hardened rapeseed alkyl, tall oil alkyl, hardened tall oil alkyl, coco alkyl, oleyl, erucyl and soya alkyl can be used for R. $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms. $R^4$ is selected from H, hydroxyl, alkyl or hydroxyalkyl groups of from 1 to about 4 carbon atoms; in one embodiment ethyl, hydroxyethyl, —OH or methyl. Of the remaining substituents, k is an integer of from 2-20, in another embodiment 2-12, and in still another embodiment 2-6, and in yet and in still another embodiment 2-4; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1.

Betaines have the general formula:

(VI)

wherein $R^1$ either can be an alkyl group from 12 to about 26 carbon atoms which may be branched or straight chain, and which may be saturated or unsaturated, or $R^1$ can be in the form of $RC(O)NH(CH_2)_k$ where R is an alkyl group from 11 to about 25 carbon atoms which may be branched or straight chain, and which may be saturated or unsaturated, and k is an integer of from 2 to about 4; $R^2$ and $R^3$ are each independently selected from a straight chain or branched alkyl or hydroxyalkyl group of from 1 to about 6 carbon atoms, in another embodiment, of 1 to 4 carbon atoms and still another embodiment from 1 to 3 carbon atoms; and m is an integer of from 1 to about 5.

In one embodiment in the present invention, the viscoelastic surfactant is a betaine having a formula (VIa):

(VIa)

wherein R is an alkyl group from 11 to about 25 carbon atoms which may be branched or straight chain, and which may be saturated or unsaturated; $R^2$ and $R^3$ are each independently selected from a straight chain or branched, alkyl or hydroxyalkyl group of from 1 to about 6 carbon atoms, in another embodiment, of 1 to 4 carbon atoms and still another embodiment from 1 to 3 carbon atoms; k is an integer of from 2 to about 4; m is an integer of from 1 to about 5.

Amidoamine oxide surfactants have the general formula:

(VII)

wherein $R^1$ is a saturated or unsaturated, linear or branched chain aliphatic group of at least about 7 carbon atoms, in one embodiment at least about 14, in one embodiment up to about 30 carbon atoms, in one embodiment up to about 21 carbon atoms; $R^1$ may be restricted to a single chain length or may be of mixed chain length such as those groups derived from natural fats and oils or petroleum stocks; k is an integer from 2 to about 6; $R^2$ and $R^3$ are the same or different and are independently selected from alkyl or hydroxyalkyl groups of from 1 to about 4 carbon atoms and in one embodiment are selected from hydroxyethyl or methyl.

In one aspect of the invention, a method of treating a subterranean formation, said formation being provided with a wellbore comprises a. providing a composition comprising an aqueous fluid, a viscoelastic surfactant, and at least one breaking compound, the breaking compound being selected from the group consisting of alkyl ether phosphates and salts thereof, alkylaryl ether phosphates and salts thereof, alkyl sulfonic acids and salts thereof, alkylaryl sulfonic acids and salts thereof, alkyl sulfates and salts thereof, alkylaryl sulfates and salts thereof, alkyl ether sulfates and salts thereof, alkylaryl ether sulfates and salts thereof, and mixtures of any two or more of the foregoing, b. injecting the composition into the subterranean formation via the wellbore, whereby the composition is present in the formation as a viscous fluid, and c. allowing the breaking agent to act upon the viscous fluid, whereby the breaking agent reduces the viscosity of the viscous fluid.

Advantageously the breaking agent of the present invention can be mixed with the aqueous fluid and the viscoelastic surfactant before the composition is injected through the wellbore into the subterranean formation, to allow thorough mixing. Because the breaking agent is a delayed breaker, the composition is present as a viscous fluid when first injected into the subterranean formation. Thus the viscous fluid has time to perform its function in the subterranean formation with respect to fracturing, acidizing, gravel packing, or the like. After a period of time, the delayed breaking agent of the present invention will begin to act upon the high viscosity fluid to break the viscoelastic gel, thereby facilitating removal of the composition from the formation. The time interval between the preparation of the composition and the commencement of breaking of the viscoelastic gel, and the rate of breaking of the gel once breaking has commenced, each can depend upon the composition of the aqueous fluid, the selection of the viscoelastic surfactant, the selection of the delayed breaking agent of the present invention, and in some cases by the environment of the subterranean formation. Therefore one skilled in the art will be able to control the amount of time that the composition has to perform a function upon the subterranean formation, and the time from completion of the performance of that function to the time the composition can be removed, by selection of the appropriate parameters.

Subterranean operations in which the methods and compositions of the present invention can find utility include those described, for example, in U.S. Pat. No. 7,879,770. In treatments that typically include multiple stages, such as most hydraulic fracturing, acid fracturing, frac-packing, and gravel packing embodiments, the delayed breaker may be added in the pad, throughout the treatment or to only some of the stages, such as some of the proppant, gravel, acid, or diversion stages. A delayed breaker is particularly useful in hydraulic fracturing, frac-packing, and gravel packing because mechanical removal methods are impossible and methods involving contacting the additive with an additional fluid are not always practical. The compositions and methods of the Invention are also particularly useful in cases where it is desirable to allow a certain amount of treatment fluid to enter the formation, for example for the purpose of altering formation wettability or oil or water saturation.

Treatment fluids used with the compositions and methods of the Invention typically also contain other materials such as demulsifiers, corrosion inhibitors, friction reducers, clay stabilizers, scale inhibitors, biocides, breaker aids, mutual solvents, surfactants, anti-foam agents, defoamers, viscosity stabilizers, iron control agents, diverters, emulsifiers, foamers, oxygen scavengers, pH control agents, buffers, and the like. Compatibility of delayed breakers disclosed herein with such additives should be checked in the laboratory. The treatments of the Invention are conducted normally; the treatment fluid and additives are transported to the site, mixed, stored, and pumped in the usual ways for the respective chemicals. When Resin Coated Proppants (RCP's) are used, testing should be done to ensure that the RCP's and delayed breakers are compatible and that neither interferes with the performance of the other; conventional natural and synthetic proppants and gravels may normally be used without testing.

The Invention is carried out by considering information about the well, the formation, the fluids and additives available, and criteria for a successful treatment, and preparing an optimized plan for maximizing treatment performance according to the data and the criteria. This is usually done by analyzing the well using treatment design and evaluation software; for example, in hydraulic fracturing software, pressure gradients are combined with fracture length and height evolution algorithms, complete leak-off information, and the effects of multiple fluid injections and their temperature changes.

The optimal concentration of the delayed breaker can be determined by choosing the breaking time and rate and measuring the break with samples of the intended fluids under the intended formation conditions. Measurement of breaking, and prediction and control of breaking, are familiar to those of ordinary skill in the arts of well stimulation and sand control. The viscoelastic surfactant should be present in an amount sufficient to provide the desired viscosity, which is needed to divert acid flow, reduce fluid loss, suspend particles and so on. The concentration of viscoelastic surfactant can be at least about 0.005%, at least about 0.01%, at least about 0.1%, at least about 0.5%, in one embodiment at least about 3%, in one embodiment up about 20%, in one embodiment up to about 10%, in one embodiment, in one embodiment up to about 8%, and in one embodiment up to about 5% by weight or by volume of the surfactant gel.

It should be understood that throughout this specification, when a concentration or amount range is listed or described as being useful, or suitable, or the like, it is intended that any and every concentration within the range, including the end points, is to be considered as having been stated. Furthermore, each numerical value should be read once as modified by the term "about" (unless already expressly so modified) and then read again as not so modified unless otherwise stated in context. For example, "a range of from 1 to 10" is to be read as indicating each and every possible number along the continuum between about 1 and about 10. In other words, when a certain range is expressed, even if the specification explicitly identifies or refers to only a few specific data points within the range, or even to no data points within the range, it is to be understood that the inventors appreciate and understand that any and all data points within the range are to be considered to have been specified, and that the inventors have possession of the entire range and all points within the range.

The delayed breakers of the Invention may be added to a wellbore fluid by metering them in to the base water fluid as a concentrated liquid. If the material is received as an emulsion, dispersion, or slurry, it can be stored in that form and used in that form directly. If it is received in dry form (for example as a solid dispersible powder of fine particles or as a dry emulsion) the particles can be pre-dispersed in water or brine as required and metered in as a liquid stream, or alternatively they may be added as solids to the base fluid stream.

The reactivity of a given delayed breaker at a particular temperature and in contact with a viscosified fluid or fluids of a particular composition (for example pH and the concentration and nature of other components, especially electrolytes), is readily determined by a simple experiment: exposing the fluid or fluids to the inventive internal breaker under treatment conditions and monitoring the viscosity.

The delayed breakers of this Invention may be used with VES's made with any type of surfactant, or mixtures of surfactants, with or without one or more co-surfactants, and with or without other additives intended to stabilize or modify the properties of the micelles or vesicles (such as buffers, shear recovery additives, salts, and rheology boosters). The VES's are selected from cationic, anionic, amphoteric, and zwitterionic.

The invention will be illustrated in some Examples by the surfactant erucamidopropyl hydroxypropylsultaine, where R is an unsaturated 21 carbon group in formula Va.

The invention will be illustrated in some Examples by the surfactant erucamidopropyl dimethylbetaine, where R is an unsaturated 21 carbon group in formula VIa.

The invention will be illustrated in some Examples by the surfactant tallow amidopropyl dimethylamine oxide, where $R^1$ is an unsaturated 17 carbon group in formula VII.

The invention will be illustrated by a breaker composition that is a mixture of compounds of formula (I) wherein R is an alkyl group varying between ten and fourteen carbon atoms, and m=3, the composition referred to herein as "Breaker Composition A." The invention will be further illustrated using other breaker compositions comprising sodium and ammonium salts of the mixture of Breaker Composition A.

General Procedures for Examples 1-7

Brines in various concentrations were prepared. To a 500 ml glass blender was added a brine solution followed by certain amount (by volume) of viscoelastic surfactant and a delayed breaker. The resulting mixture was stirred for 3 min at an rpm of 3000-4000 in the blender. The resultant gel was then centrifuged at an rpm of 1000 for 15 min to remove the air bubbles. Rheological performance was evaluated using a Grace Instrument Rheometer (model M5600). A pressure of 400 psi was applied to minimize evaporation of the sample, especially at high temperatures. Viscosity was measured at a shear rate of 100 s$^{-1}$ with ramps down to 75 s$^{-1}$, 50 s$^{-1}$, and 25 s$^{-1}$ every 30 min. All the experiments were performed at fixed temperature (200° F., 250° F., and 300° F.), with and without breakers and other additives as noted.

Example 1

Figure 1:
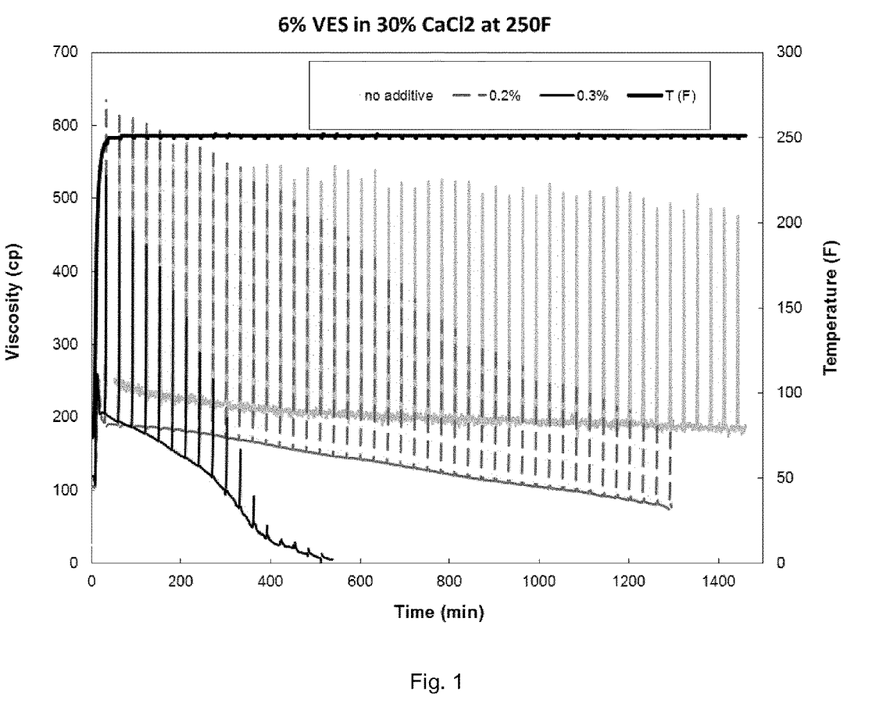
FIG. 1 is a graph of viscosity vs. time for compositions comprising a 30% $CaCl_2$ brine, 6% sultaine viscoelastic surfactant, and alkyl ether phosphate breaking agent in concentrations of 0%, 0.2%, and 0.3% at 250° F., in accordance with Example 1.

This example demonstrates the use of Breaker Composition A as a delayed breaker at 250° F. Three samples of a viscous fluid containing 6 vol % erucamidopropyl hydroxypropylsultaine and 30 wt % CaCl$_2$ were prepared, to which were added Breaker Composition A at concentrations of 0, 0.2, and 0.3 vol % respectively. The data illustrated in FIGS. 1A, 1B, and 1C show that the elasticity decreased with time. Higher dosage of delayed breaker gave lower viscosity and faster observed breaking.

Example 2

Figure 2:
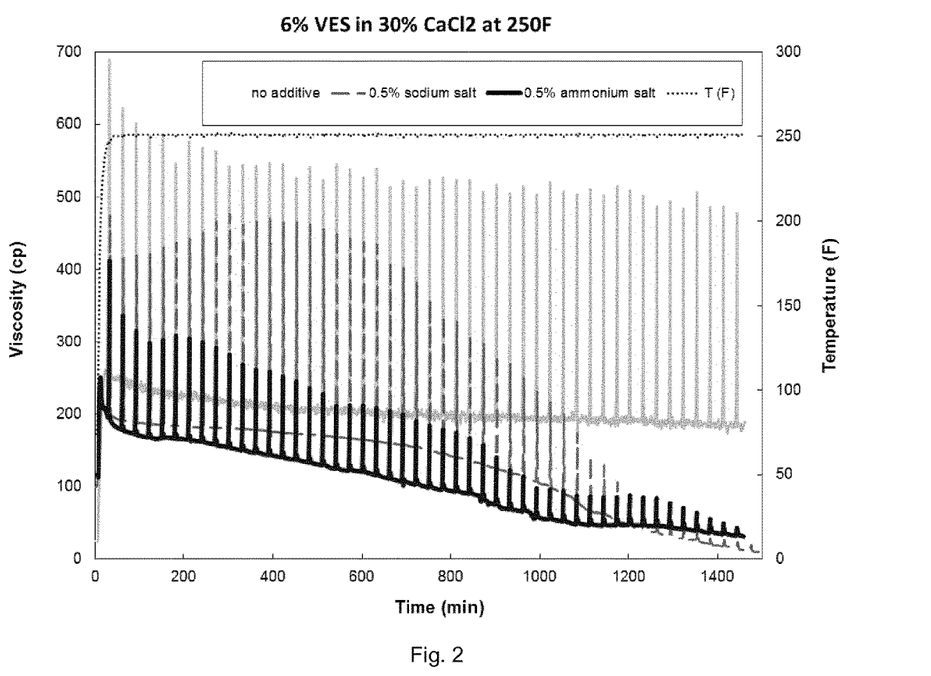
FIG. 2 is a graph of viscosity vs. time for compositions comprising a 30% $CaCl_2$ brine and 6% sultaine viscoelastic surfactant with no breaking agent and with 0.5% of the sodium and ammonium salts of an alkyl ether phosphate breaking agent at 250° F., in accordance with Example 2.

This example demonstrates the use of sodium and ammonium salts of Breaker Composition A as delayed breakers at 250° F. Three samples of a viscous fluid containing 6 vol % erucamidopropyl hydroxypropylsultaine and 30 wt % CaCl$_2$ were prepared, to which were added no breaker, 0.5 vol % of the ammonium salt of Breaker Composition A, and 0.5% of the sodium salt of Breaker Composition A, respectively. The data in FIG. 2 show that the neutralized delayed breakers also can function effectively as delayed breakers of the VES composition.

Example 3

Figure 3:
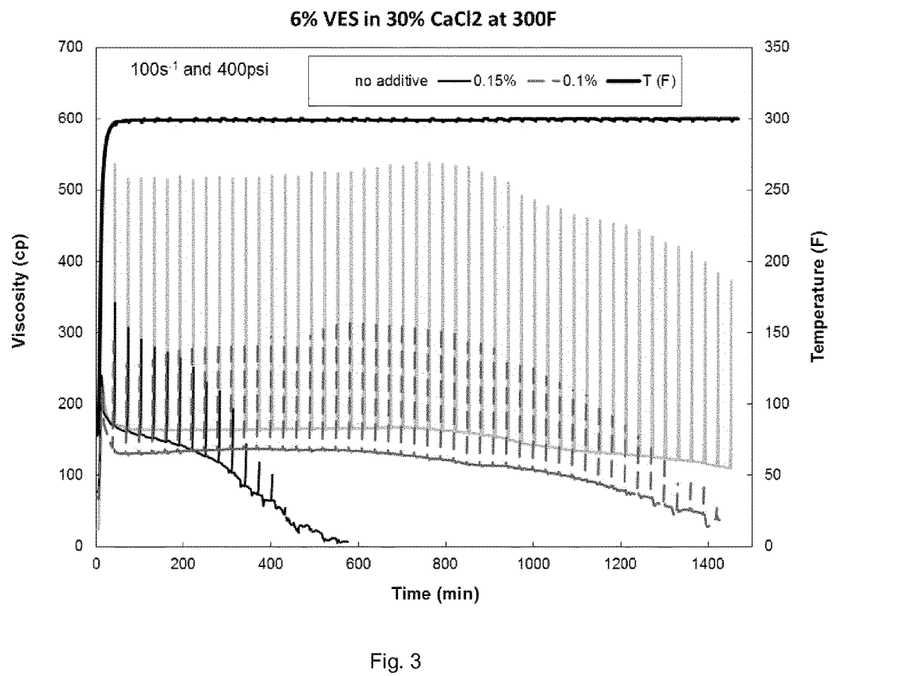
FIG. 3 is a graph of viscosity vs. time for compositions comprising a 30% $CaCl_2$ brine, 6% sultaine viscoelastic surfactant, and alkyl ether phosphate breaking agent in concentrations of 0%, 0.1%, and 0.15% at 300° F., in accordance with Example 3.

This example demonstrates the use of ammonium salts of Breaker Composition A as delayed breakers at 300° F. Three samples of a viscous fluid containing 6 vol % erucamidopropyl hydroxypropylsultaine and 30 wt % CaCl$_2$ were prepared, to which were added the ammonium salt of Breaker Composition A at concentrations of 0, 0.1, and 0.15 vol %, respectively. The data in FIG. 3 show that the breaking time decreased with the increased concentration of delayed breaker.

Example 4

Figure 4:
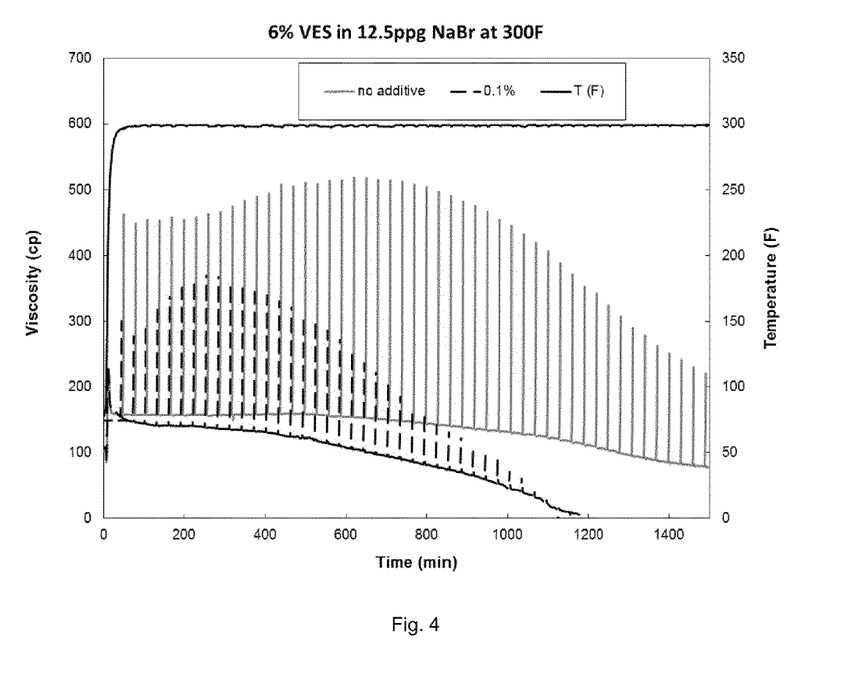
FIG. 4 is a graph of viscosity vs. time for compositions comprising a 12.5 ppg NaBr brine, 6% sultaine viscoelastic surfactant, and alkyl ether phosphate breaking agent in concentrations of 0% and 0.1% at 300° F., in accordance with Example 4.

This example demonstrates the use of the delayed breakers of the present invention in a heavy brine application at 300° F. Two samples of a viscous fluid containing 6 vol % erucamidopropyl hydroxypropylsultaine and 12.5 ppg NaBr were prepared, to which were added the ammonium salt of Breaker Composition A at concentrations of 0 and 0.1 vol % respectively. High density NaBr brine is often used in the completion or heavy brine hydraulic fracturing application. The data in FIG. 4 show that the elasticity decreased slowly over time in the presence of delayed breaker.

Example 5

Figure 5:
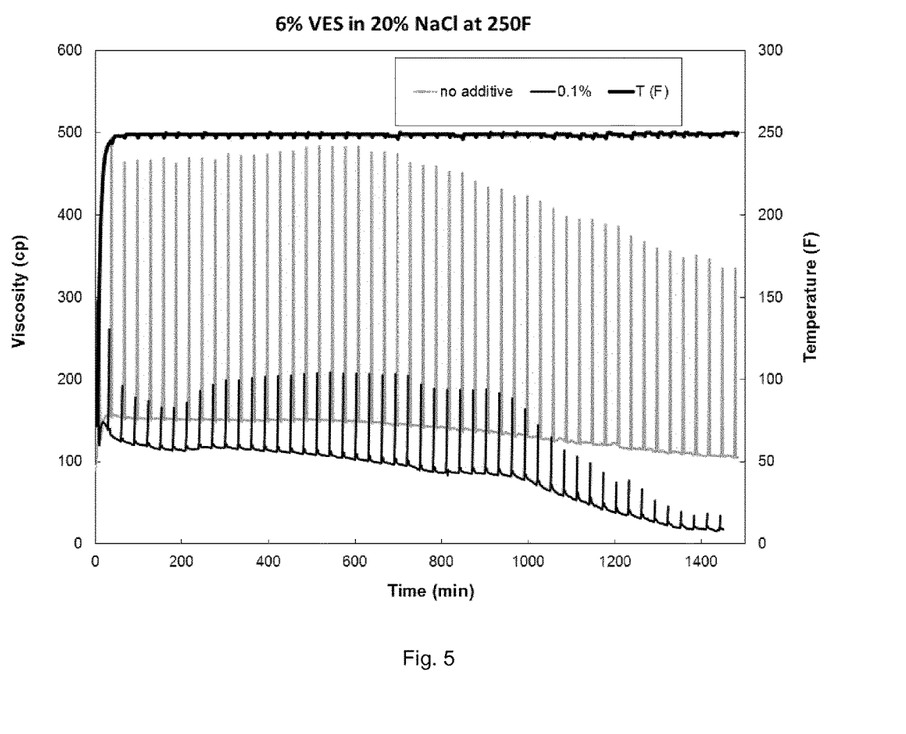
FIG. 5 is a graph of viscosity vs. time for composition comprising a 20% NaCl brine, 6% sultaine viscoelastic surfactant, and alkyl ether phosphate breaking agent in concentrations of 0% and 0.1% at 250° F., in accordance with Example 5.

This example demonstrates the use of ammonium salts of Breaker Composition A as a delayed breaker in 20% NaCl at 250° F. Two samples of a viscous fluid containing 6 vol % erucamidopropyl hydroxypropylsultaine and 20% NaCl were prepared, to which were added the ammonium salt of Breaker Composition A at concentrations of 0 and 0.1% respectively. The data in FIG. 5 show that the breaker composition of the present invention functioned to slowly break the viscosity of the gel.

Example 6

Figure 6:
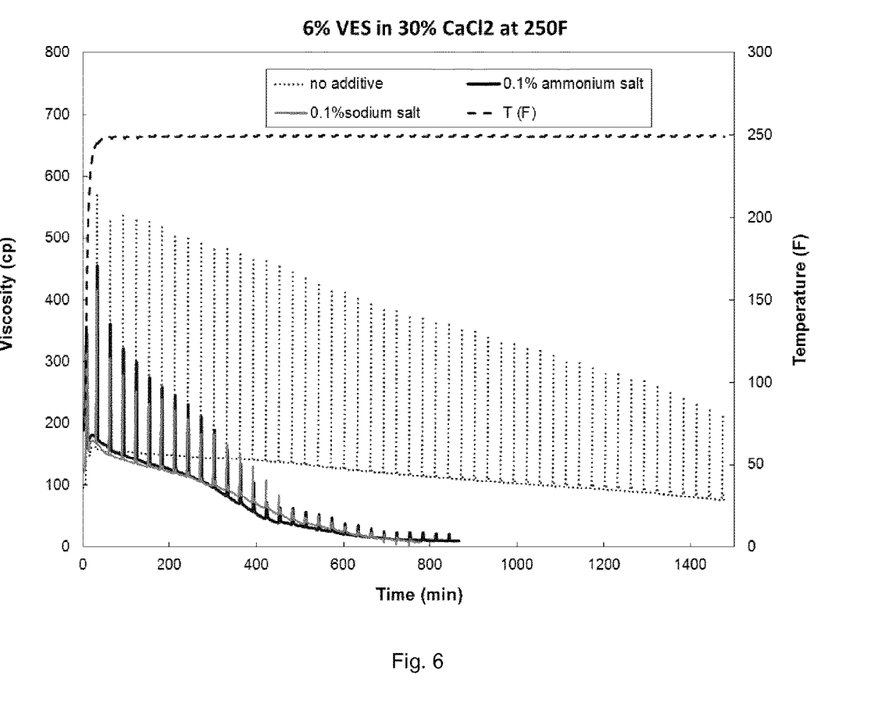
FIG. 6 is a graph of viscosity vs. time for compositions comprising a 30% $CaCl_2$ brine, 6% betaine viscoelastic surfactant, with no breaking agent and with 0.1% of the sodium and ammonium salts of an alkyl ether phosphate breaking agent at 250° F., in accordance with Example 6.

This example demonstrates the use of the delayed breakers of the present invention in viscous fluid containing a betaine VES at 250° F. Four samples were prepared of a viscous fluid containing 6 vol % erucamidopropyl dimethyl betaine and 30% CaCl$_2$ to which were added sodium or ammonium salts of Breaker Composition A at concentrations of 0 and 0.1 vol %, respectively. The data in FIG. 6 show that both the sodium and ammonium salts of Breaker Composition A work well as a delayed breaker.

Example 7

Figure 7:
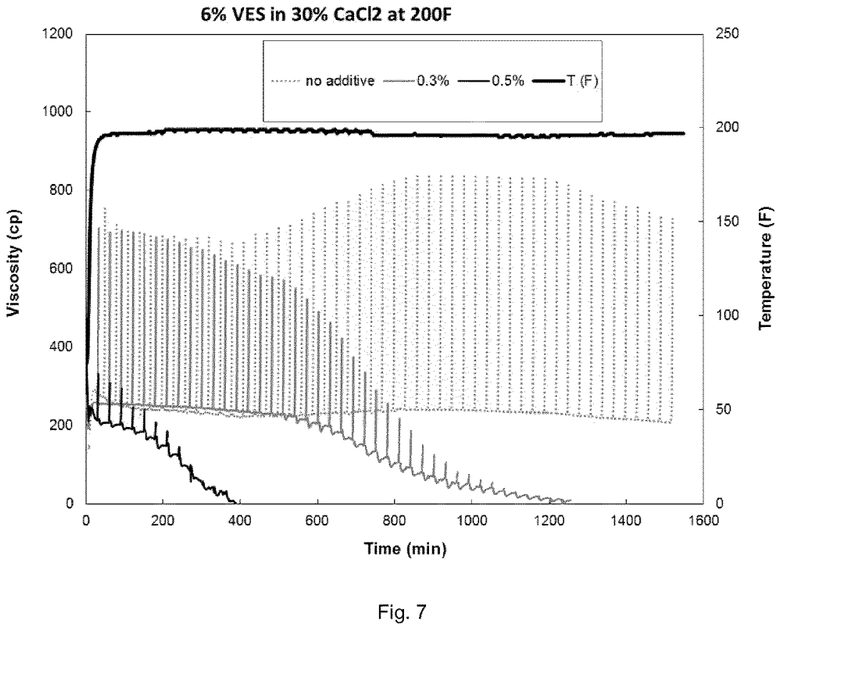
FIG. 7 is a graph of viscosity vs. time for compositions comprising a 30% $CaCl_2$ brine, 6% amidoamine oxide viscoelastic surfactant, and alkyl ether phosphate breaking agent in concentrations of 0%, 0.3%, and 0.5% at 200° F., in accordance with Example 7.

This example demonstrates the use of the delayed breakers of the present invention in viscous fluid containing amidoamine oxide VES at 200° F. Three samples were prepared of a viscous fluid containing 6 vol % tallow amidopropyl dimethylamine oxide and 30% CaCl$_2$ to which were added ammonium salts of Breaker Composition A at concentrations of 0, 0.3, and 0.5 vol %, respectively. The data in FIG. 7 shows that the higher dosage of delayed breaker leads to the shorter breaking time.

Example 8

Figure 8:
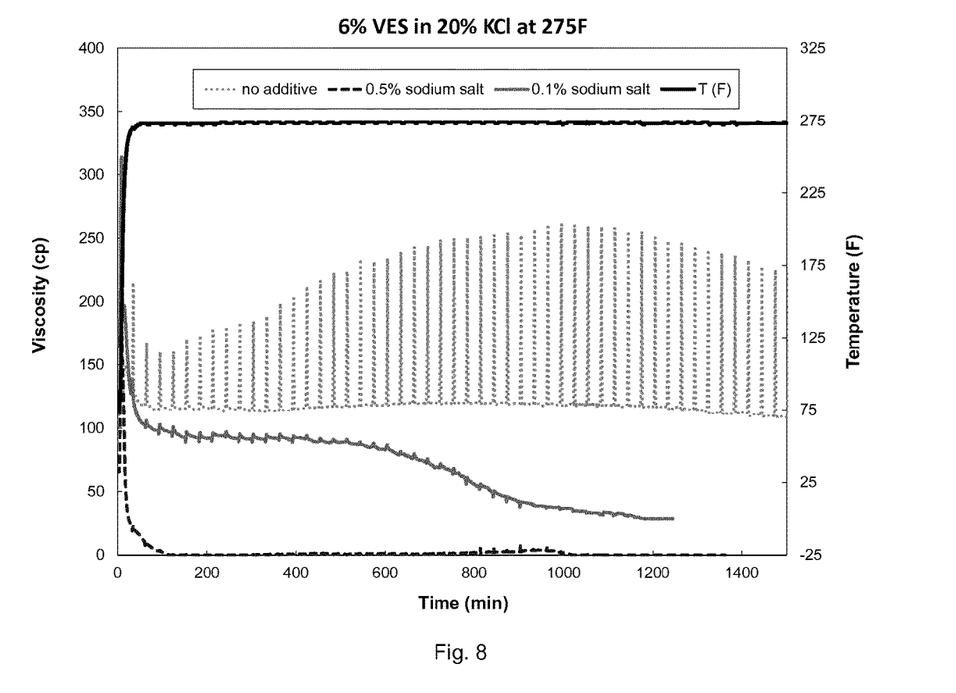
FIG. 8 is a graph of viscosity vs. time for compositions comprising a 20% KCl brine, 6% sultaine viscoelastic surfactant, and alkyl ether phosphate sodium salt breaking agent in concentrations of 0%, 0.1%, and 0.5% at 275° F., in accordance with Example 8.

This example demonstrates the use of the delayed breakers of the present invention in a viscous fluid containing sultaine VES at 275° F. Three samples were prepared of a viscous fluid containing 6 vol % erucamidopropyl hydroxypropylsultaine and 20% KCl to which were added sodium salts of Breaker Composition A at concentrations of 0%, 0.1%, and 0.5 vol %, respectively The results are illustrated in FIG. 8.

Although the invention is illustrated and described herein with reference to specific embodiments, the invention is not intended to be limited to the details shown.

Rather, various modifications may be made in the details within the scope and range of equivalents of the claims and without departing from the spirit of the invention.

The invention claimed is:

1. A composition comprising an aqueous fluid, a viscoelastic surfactant, and at least one breaking compound, the breaking compound being selected from the group consisting of alkyl ether phosphates and salts thereof, alkylaryl ether phosphates and salts thereof, and mixtures of any of the foregoing.

2. The composition of claim 1 wherein said viscoelastic surfactant is zwitterionic, cationic, anionic, or amphoteric.

3. The composition of claim 1 wherein the viscoelastic surfactant is selected from the group consisting of betaines, sultaines, and amidoamine oxides.

4. The composition of claim 1 wherein the breaking compound is selected from the group consisting of alkyl ether phosphates and salts thereof.

5. The composition of claim 1 wherein the salt is selected from alkali metal salts and ammonium salts.

6. The composition of claim 1 wherein the alkyl ether phosphates are of the formula wherein R is an alkyl group of 6-30 carbon atoms and m=2-20.

7. A method of treating a subterranean formation, said formation being provided with a wellbore, the method comprising
   a. providing a composition comprising an aqueous fluid, a viscoelastic surfactant, and at least one breaking compound, the breaking compound being selected from the group consisting of alkyl ether phosphates and salts thereof, alkylaryl ether phosphates and salts thereof, and mixtures of any of the foregoing,
   b. injecting the composition into the subterranean formation via the wellbore, whereby the composition is present in the formation as a viscous fluid, and
   c. allowing the breaking agent to act upon the viscous fluid, whereby the breaking agent reduces the viscosity of the viscous fluid.

8. The method of claim 7 wherein said viscoelastic surfactant is zwitterionic, cationic, anionic, or amphoteric.

9. The method of claim 7 wherein the viscoelastic surfactant is selected from the group consisting of betaines, sultaines, and amidoamine oxides.

10. The method of claim 7 wherein the breaking compound is selected from the group consisting of alkyl ether phosphates and salts thereof.

11. The method of claim 7 wherein the salt is selected from alkali metal salts and ammonium salts.

12. The method of claim 7 wherein the alkyl ether phosphates are of the formula wherein R is an alkyl group of 6-30 carbon atoms and m=2-20.

13. Use in the treatment of a subterranean formation of a compound being selected from the group consisting of alkyl ether phosphates and salts thereof, alkylaryl ether phosphates and salts thereof, and mixtures of any of the foregoing, said salts preferably being sodium or ammonium salts, as a breaker for a viscoelastic surfactant formulation.

* * * * *